(12) United States Patent
Maemura et al.

(10) Patent No.: US 8,777,147 B2
(45) Date of Patent: Jul. 15, 2014

(54) SEAT BELT DEVICE

(75) Inventors: Eiji Maemura, Kanagawa (JP);
Yukinori Midorikawa, Kanagawa (JP);
Masuo Matsuki, Kanagawa (JP)

(73) Assignee: Autoliv Development AB, Vårgårda (SE)

( * ) Notice: Subject to any disclaimer, the term of this patent is extended or adjusted under 35 U.S.C. 154(b) by 1925 days.

(21) Appl. No.: 11/914,893

(22) PCT Filed: May 18, 2006

(86) PCT No.: PCT/JP2006/309960
§ 371 (c)(1),
(2), (4) Date: Jan. 7, 2011

(87) PCT Pub. No.: WO2006/123750
PCT Pub. Date: Nov. 23, 2006

(65) Prior Publication Data
US 2011/0101145 A1    May 5, 2011

(30) Foreign Application Priority Data

May 19, 2005    (JP) .............................. P. 2005-146173

(51) Int. Cl.
*B65H 75/48*    (2006.01)

(52) U.S. Cl.
USPC ...................................... 242/374; 242/382.2

(58) Field of Classification Search
USPC ............................................ 242/374, 382.2
See application file for complete search history.

(56) References Cited

U.S. PATENT DOCUMENTS

| | | | | |
|---|---|---|---|---|
| 6,910,653 B2 * | 6/2005 | Tanji | ........................... | 242/390.8 |
| 2003/0122020 A1 | 7/2003 | Tanji | | |
| 2004/0182963 A1 | 9/2004 | Mori et al. | | |
| 2008/0290203 A1 * | 11/2008 | Kohlndorfer et al. | ......... | 242/374 |
| 2009/0294565 A1 * | 12/2009 | Ouchi et al. | ............... | 242/390.2 |

FOREIGN PATENT DOCUMENTS

| | | |
|---|---|---|
| DE | 100 52 112 A1 | 5/2002 |
| EP | 1 323 599 A1 | 7/2003 |
| EP | 1 439 098 A1 | 7/2004 |
| JP | 2003-191819 | 7/2003 |
| JP | 2004-268896 | 9/2004 |
| WO | WO 2005/021339 A1 | 3/2005 |

OTHER PUBLICATIONS

European Search Report—Jun. 10, 2011.

* cited by examiner

*Primary Examiner* — Sang Kim
(74) *Attorney, Agent, or Firm* — Brinks Gilson & Lione

(57) ABSTRACT

A seat belt device includes a spindle 11 for retracting a seat belt 13, an electric actuator 55, a pre-tensioner 14 and a power transmission mechanism 20, wherein the power transmission mechanism 20 can reversibly switch the connection and disconnection between the electric actuator 55 and the spindle 11 before the pre-tensioner 14 is activated, while when the pre-tensioner 14 is activated, the power transmission mechanism 20 non-reversibly interrupts the connection between the electric actuator 55 and the spindle 11.

11 Claims, 21 Drawing Sheets

US 8,777,147 B2

SEAT BELT DEVICE

CROSS REFERENCE TO RELATED APPLICATIONS

This application claims priority to JP 2005-146173, filed May 19, 2005 and PCT/JP2006/309960, filed May 18, 2006.

FIELD OF THE INVENTION

The present invention relates to a seat belt device, and more particularly to a seat belt device which includes an electric actuator utilizing a motor and a pyrotechnic pre-tensioner actuator (a pre-tensioner).

BACKGROUND OF THE INVENTION

Conventionally, in a seat belt device of this type, when there is a possibility of collision, a seat belt (webbing) is retracted by the electric actuator before collision, and then the possibility of collision disappears, the seat belt is put back to the state before the possible collision was sensed, and when the collision occurs, the seat belt is retracted by the pre-tensioner (for example, refer to Patent Document No. JP-A-2003-191819).

SUMMARY OF THE INVENTION

In this way, in the seat belt device which includes the electric actuator which produces power to rotate a spindle and the pre-tensioner which produces another form of power to rotate the spindle, when the pre-tensioner is activated, the spindle for retracting the seat belt is desirably disconnected from the electric actuator.

Consequently, a main object of the invention is to provide a seat belt device including a seat belt retracting member such as a spindle for retracting the seat belt, a primary rotation source such as an electric actuator for rotating the seat belt retracting member when it is brought into connection with the seat belt retracting member, and a secondary rotation source such as a pre-tensioner for rotating the seat belt retracting member at faster speeds than the primary rotational source, wherein when the secondary rotation source such as the pre-tensioner is activated, the connection of the seat belt retracting member such as the spindle with the first rotation source such as a motor can be interrupted.

According to the invention, there is provided a seat belt device including:
  a spindle for retracting a seat belt;
  an electric actuator for generating power for rotating the spindle;
  a pre-tensioner for generating another form of power for rotating the spindle; and
  a power transmission mechanism for transmitting the power from the electric actuator to the spindle, wherein the power transmission mechanism can reversibly switch the connection and disconnection between the electric actuator and the spindle before the pre-tensioner is activated, while when the pre-tensioner is activated, the power transmission mechanism non-reversibly interrupts the connection between the electric actuator and the spindle.

In addition, according to the invention, there is provided a seat belt device including:
  a spindle for retracting a seat belt;
  an electric actuator for generating power for rotating the spindle;
  a pre-tensioner for generating another form of power for rotating the spindle; and
  a power transmission mechanism for transmitting the power from the electric actuator to the spindle, wherein when the pre-tensioner is activated, the power transmission mechanism interrupts the connection between the electric actuator and the pre-tensioner by making use of the rotation of the spindle by the pre-tensioner.

In addition, according to the invention, there is provided a seat belt device including:
  a seat belt retracting member for retracting a seat belt;
  a primary rotation source for rotating the seat belt retracting member when it is brought into connection with the seat belt retracting member;
  a secondary rotation source for rotating the seat belt retracting member at faster speeds than the primary rotation source; and
  a power transmission mechanism, wherein the power transmission mechanism can reversibly switch the connection and disconnection between the primary rotation source and the seat belt retracting member before the secondary rotation source is activated, while when the secondary rotation source is activated, the power transmission mechanism non-reversibly interrupts the connection between the first rotation source and the seat belt retracting member.

Furthermore, according to the invention, there is provided a seat belt device including:
  a spindle for retracting a seat belt;
  an electric actuator for generating power for rotating the spindle; and
  a power transmission mechanism for transmitting the power from the electric actuator to the spindle, wherein the power transmission mechanism has an actuator-side gear to which the power from the electric actuator is transmitted, a spindle-side gear which is provided on the spindle's side and an elastic piece which is mounted either of the actuator-side gear and the spindle-side gear and which can be brought into engagement with the other gear and includes a torque limiter in which when a torque difference which is larger than a predetermined value is generated between the actuator-side gear and the spindle-side gear, the elastic piece cancels the engagement with the other gear so as to move relative to the other gear so that the torque difference becomes equal to or less than the predetermined value.

Advantage Of The Invention

According to the invention, there is provided the seat belt device including the seat belt retracting member such as the spindle for retracting the seat belt, the primary rotation source such as the electric motor which is brought into connection with the seat belt retracting member to rotate the seat belt retracting member and the secondary rotation source such as the pre-tensioner for rotating the seat belt retracting member at faster speeds than the primary rotation source, wherein when the secondary rotation source such as the pre-tensioner is activated, the connection between the seat belt retracting member such as the spindle and the primary rotation source such as the motor can be interrupted.

DETAILED DESCRIPTION

Next, seat belt devices of respective embodiments of the invention will be described by reference to the drawings.

Figure 1:
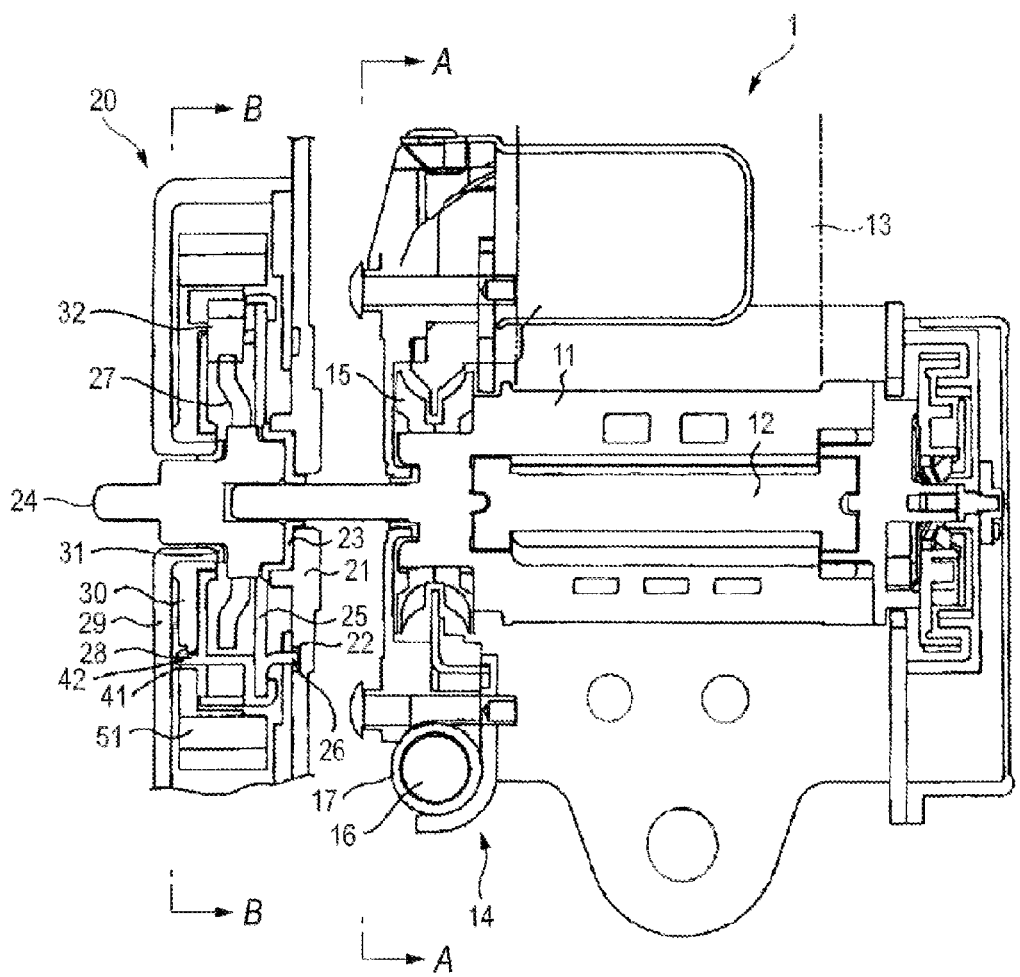
FIG. 1 is a schematic vertical sectional view which explains a seat belt device of a first embodiment of the invention.
Figure 2:
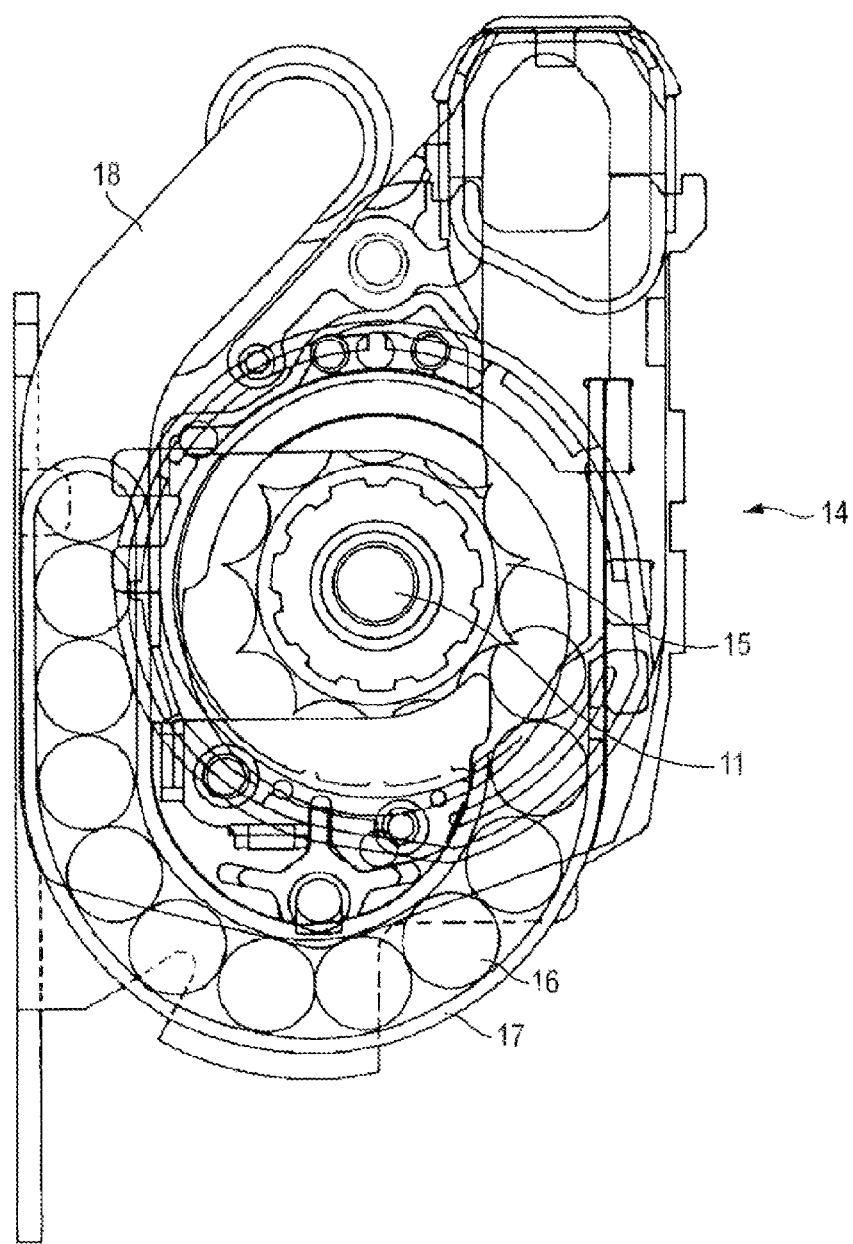
FIG. 2 is a cutaway view taken along the line A-A and viewed in a direction indicated by arrows attached to the line in FIG. 1.
Figure 6:
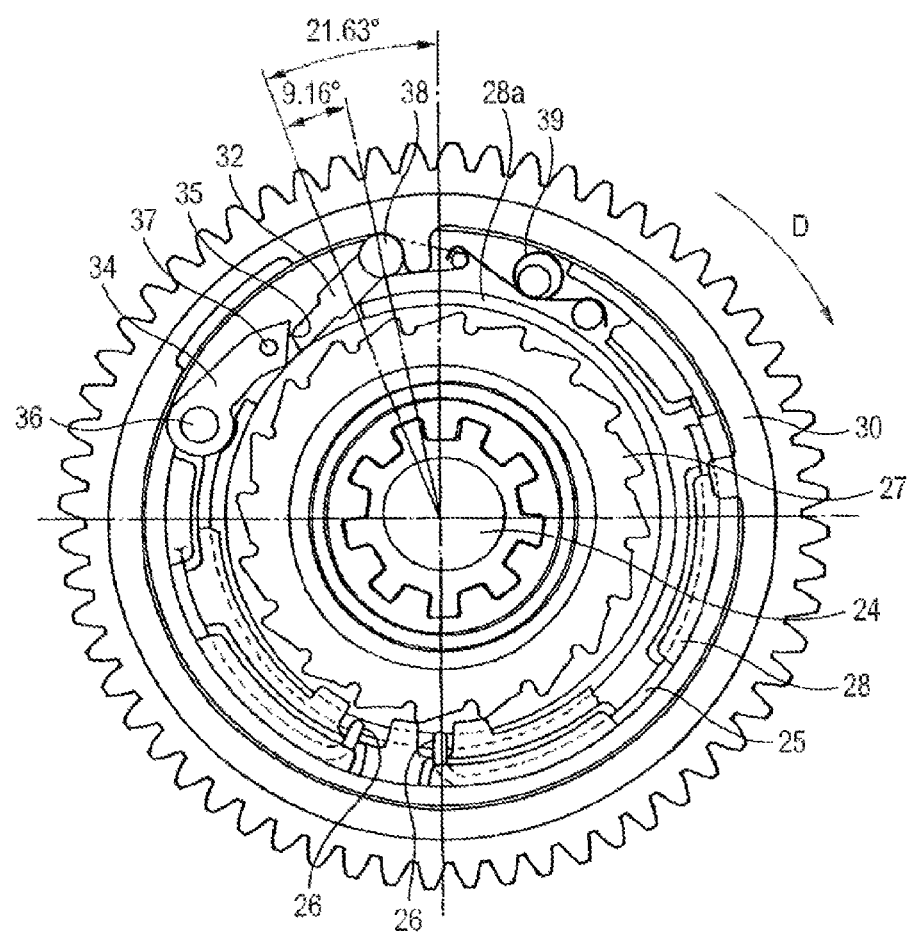
FIG. 6 is a vertical sectional view taken along the line B-B in FIG. 1, which explains the operation of the clutch for transmitting power from the motor.
Figure 7:
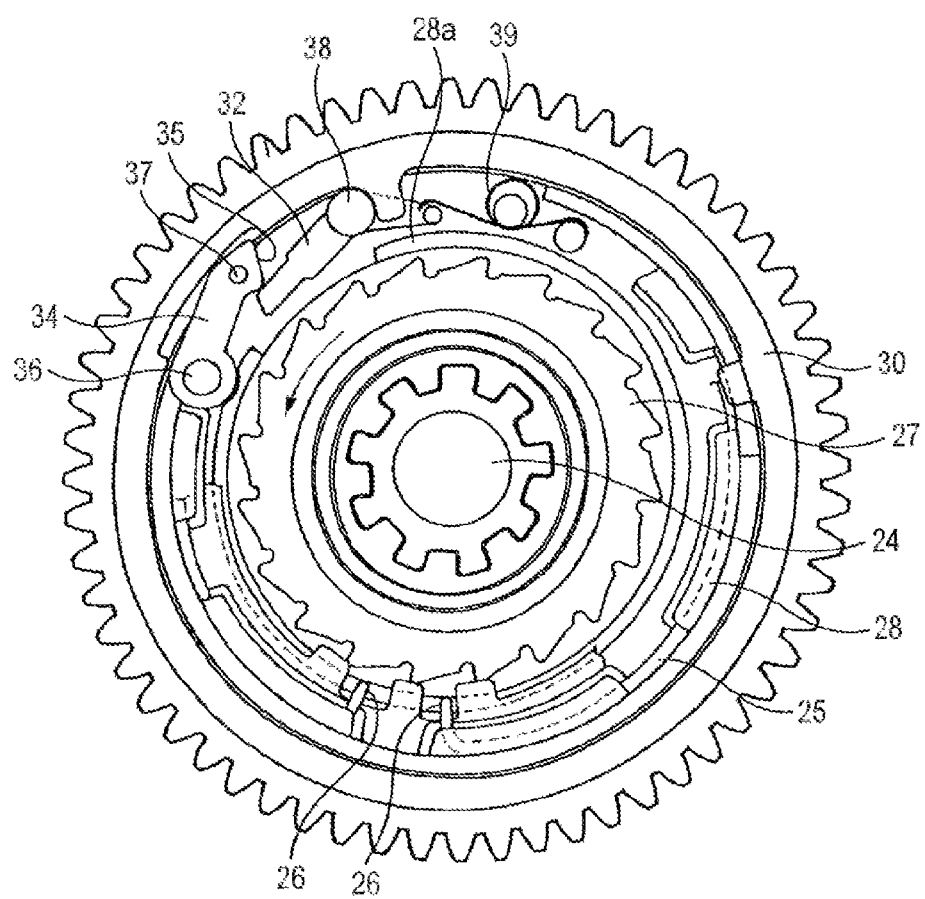
FIG. 7 is a vertical sectional view taken along the line B-B in FIG. 1, which explains the operation of the clutch for transmitting power from the motor.
Figure 8:
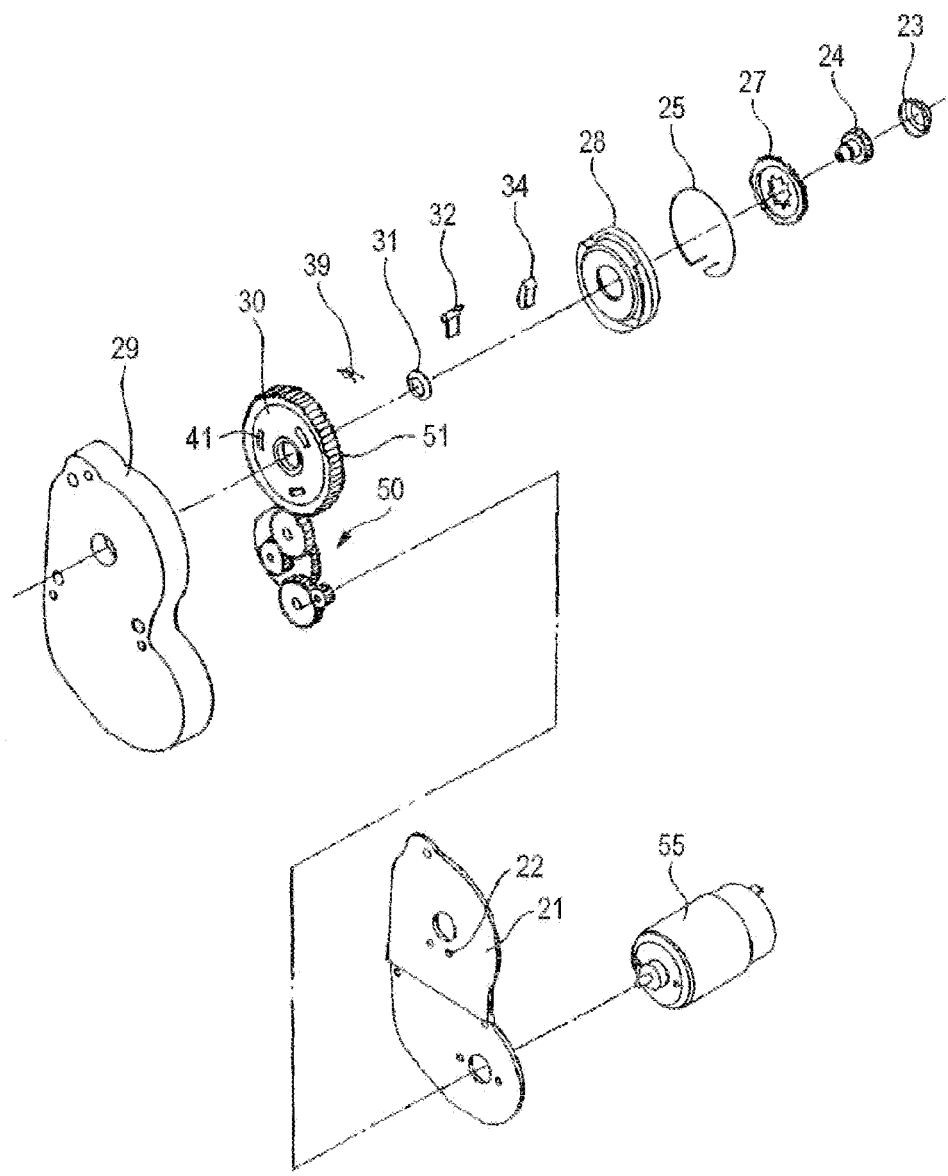
FIG. 8 is an exploded schematic perspective view of the clutch for transmitting the power from the motor of the seat belt device of the first embodiment of the invention.

FIG. 1 is a schematic vertical sectional view which describes a seat belt device of a first embodiment of the invention, FIG. 2 is a cutaway view taken along the line A-A and viewed in a direction indicated by arrows attached to the line in FIG. 1, FIGS. 3 to 7 are vertical sectional views taken along the line B-B in FIG. 1 which describe the operations of a clutch for transmitting power from a motor, and FIG. 8 is an exploded schematic perspective view of the clutch for transmitting the power from the motor of the seat belt device of the first embodiment of the invention.

A seat belt device 1 of this embodiment includes a spindle 11 for retracting a seat belt (webbing) 13,
a pyrotechnic actuator (pre-tensioner) 14 connected to the spindle 11,
a motor 55 as an electric actuator and
a clutch 20 as a power transmission mechanism for power from the motor 55 to the spindle 11.

A torsion bar 12 functioning as an energy absorbing mechanism is provided within the spindle 11 so as to be connected to the spindle 11.

The pretensioner 14 includes a pinion 15 connected to the spindle 11, a tube 17 which accommodates balls 16 and a gas generator 18 provided at one end of the tube 17. When explosives are set alighted, the gas generator 18 generates gas, whereby the balls 16 accommodated within the tube 17 are strongly pushed out. The balls 16 which are so pushed out then move along a groove in the pinion 15 so as to rotate the spindle 11.

The motor 55 is connected to a gear assembly 50, whereby the rotation of the motor 55 is decelerated by the gear assembly 50. The gear assembly 50 and the clutch 20 are accommodated within a container defined by a lower cover 21 and an upper cover 29.

The clutch 20 includes a joint 24 connected to the spindle 11,
a latch plate (a ratchet wheel) 27 integrated with the joint 24 to rotate together with the spindle 11,
a final gear 51 of the gear assembly 50 which is gear connected to a rotational shaft of the motor 55,
a pawl 32 mounted on the final gear 51 so as to rotate round a shaft 38 and adapted to be brought into engagement with a tooth of the latch plate (ratchet wheel) 27,
a return spring 39 which is a biasing member for biasing the pawl 32 in a direction in which the pawl 32 is disconnected from the latch plate 27,
a guide ring 30 provided inside the final gear 51 so as to be integral with the final gear 51,
a clutch wheel 28 including three leg portions 42 which fit into three holes 41 in the guide ring 30 so as to rotate relatively at a required angle,
a rotor cam 34 mounted on the clutch wheel 28 so as to rotate round a shaft 36 while mounted fixedly on the clutch wheel 28 by means of a fixing pin 37, whereby its rotation is prohibited in such a state that it is fixed to the clutch wheel 28 by the fixing pin 37, while its rotation is allowed due to the fixing pin 37 being broken,
a friction spring 25 mounted on the lower cover 21 by an end portion 26 being caused to fit in a recessed portion 22 in the lower cover 21 and connected with the clutch wheel 28 by virtue of friction sliding, and
bushes 23, 31.

One end of the pawl 32 moves along a cam surface 35 of the rotor cam 34.

In addition, a rib 28a is formed on the clutch wheel 28 in a predetermined position which extends in a circumferential direction, and one end portion of this rib 28a is situated in the vicinity of the pawl 32 when in an inoperative state where retraction by the motor 55 is not performed. Then, when the pawl 32 rotates due to a violently vehicle vibrating with the motor 55 in the inoperative state, the rib 28a is brought into abutment with the pawl 32 so as to prevent an abrupt rotation of the pawl 32 in a direction in which the pawl 32 is brought into engagement with the latch plate 27.

Next, the operation of the seat belt device of the embodiment will be described.

When there is a possibility of collision, the seat belt 13 is retracted by the motor 55 before the possible collision, while when the possibility of collision disappears, the seat belt 13 is brought back to the state before the possible collision was sensed. When a collision occurs, the seat belt 13 is retracted by the pyrotechnic actuator (pre-tensioner) 14 at faster speeds than the retracting speed by the motor before collision, during which when a predetermined or more tension is applied to the seat belt 13, the tension is limited by the torsion bar 12.

Next, the operation of the clutch 20 will be described.

Figure 3:
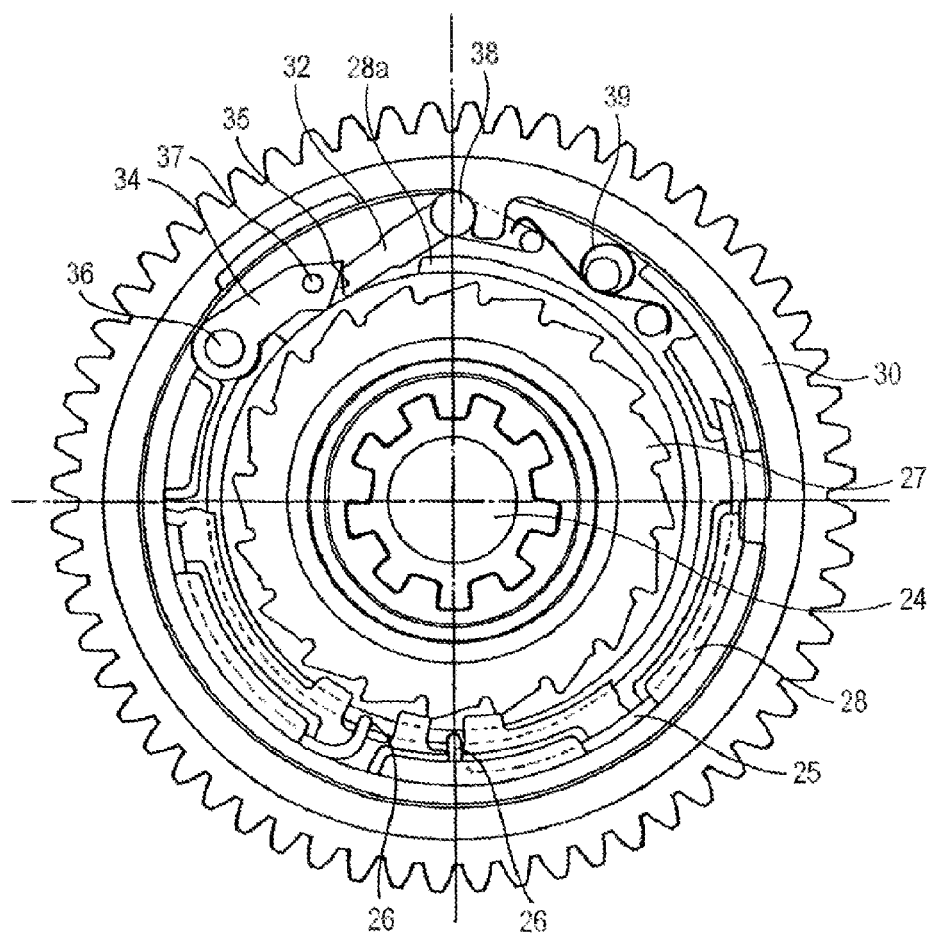
FIG. 3 is a vertical sectional view taken along the line B-B in FIG. 1, which explains the operation of a clutch for transmitting power from a motor.

Firstly, as shown in FIG. 3, when no retraction is performed by the motor 55, the latch plate 27 and the pawl 32 are out of engagement. Only the latch plate 27 integrated with the spindle 11 rotates, and normal retracting/stretching of the seat belt 13 can be performed.

Figure 4:
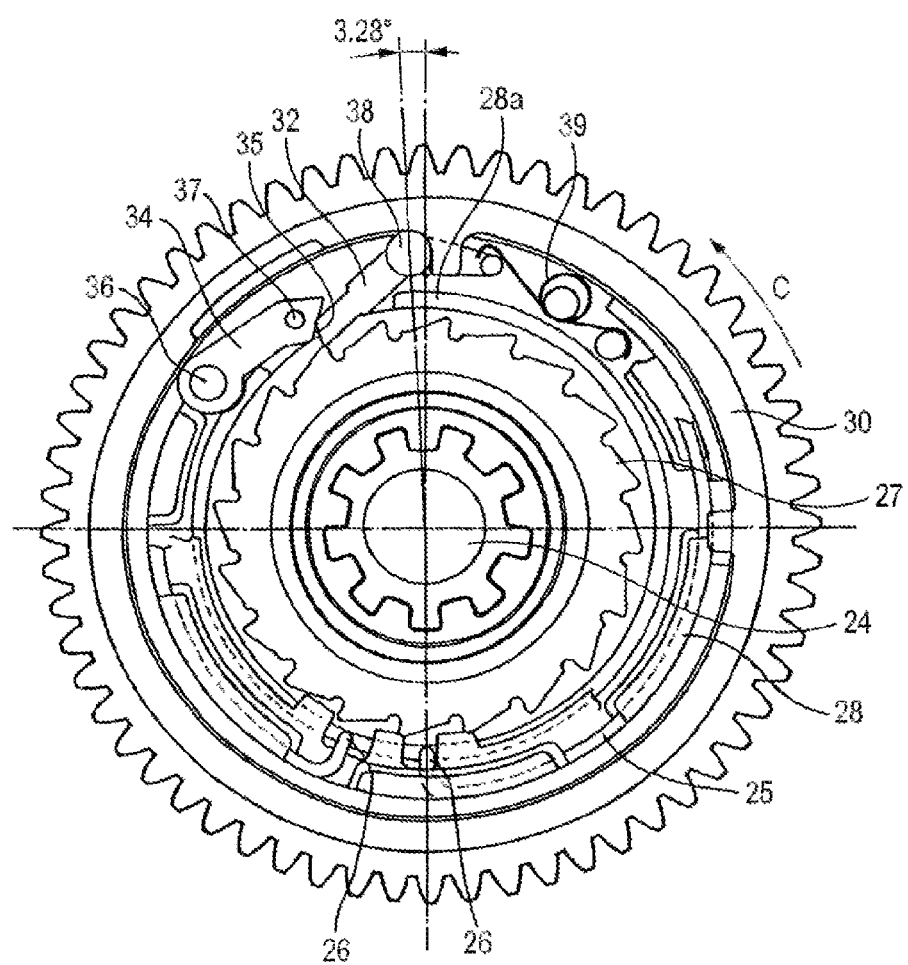
FIG. 4 is a vertical sectional view taken along the line B-B in FIG. 1, which explains the operation of the clutch for transmitting power from the motor.

As shown in FIG. 4, when the motor 55 rotates in a retracting direction, the final gear 51, which is gear connected to the rotational shaft of the motor 55, rotates in a counterclockwise direction (C direction). The pawl 32, which is mounted rotatably on the final gear 51, rotates to the latch plate 27 side along the cam surface 35 of the rotor cam 34 so as to start engagement with the latch plate 27.

Figure 5:
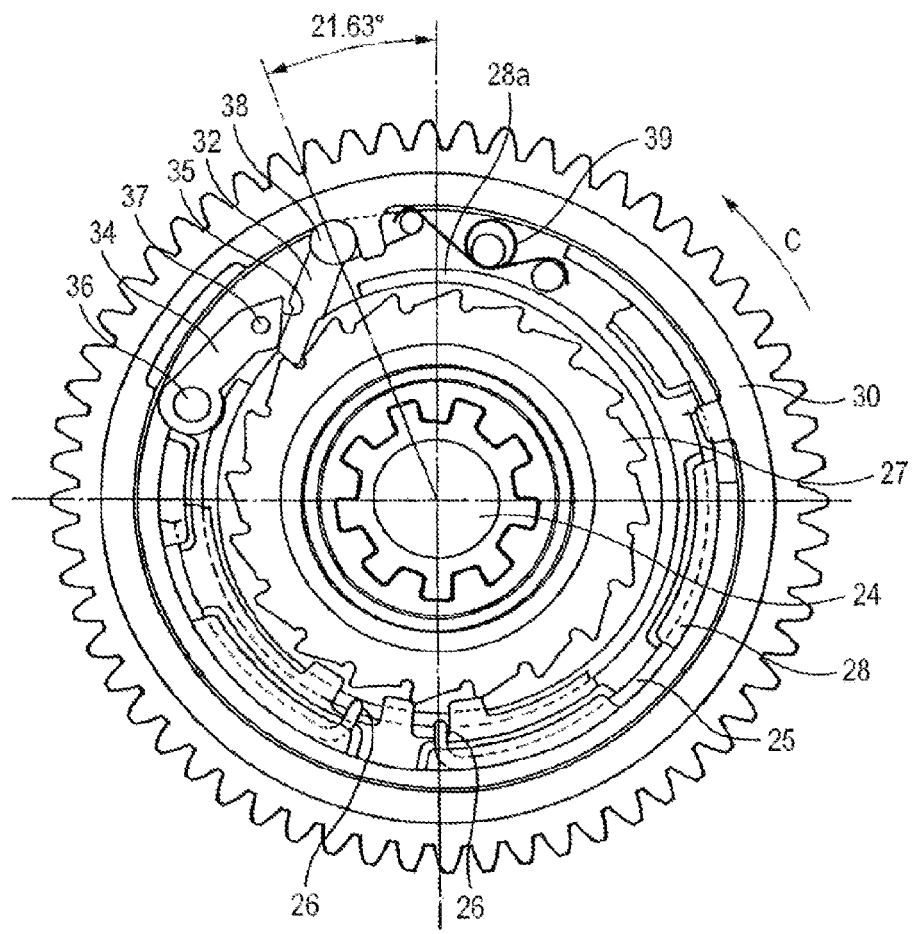
FIG. 5 is a vertical sectional view taken along the line B-B in FIG. 1, which explains the operation of the clutch for transmitting power from the motor.

As shown in FIG. 5, when the pawl 32 is brought into engagement with the latch plate 27, the rotation of the final gear 51 is transmitted to the spindle 11 via the latch plate 27, whereby the seat belt 13 is started to be retracted. As this occurs, the rotor cam 34 rotates together with the clutch wheel 28 while friction sliding relative to the friction spring 25.

As shown in FIG. 6, when the motor 55 rotates in releasing direction, in response to the rotation, the final gear 51 rotates in the releasing direction (clockwise direction: D direction). While the pawl 32 rotates together with the final gear 51, the clutch wheel 28 and the rotor cam 34 mounted on the clutch wheel 28, are maintained by the friction spring 25. The pawl 32 departs from the latch plate along the cam surface 35 of the rotor cam 34 by virtue of the biasing force of the return spring 39, whereby the pawl 32 is disengaged from the latch plate.

As shown in FIG. 7, when the pre-tensioner 14 is activated, the pawl 32 is flicked out outwardly by a tooth surface of the latch plate 27 by virtue of the fast retracting rotation of the spindle 11 and the latch plate 27 integrated therewith. At the same time, the rotor cam 34 is pushed by the pawl 32 and rotates outwardly about the shaft 36 of the clutch wheel 28. As a result, the pawl 32 and the rotor cam 34 are held on an outer circumferential portion by virtue of the biasing force of the return spring. Thereafter the power of the motor 55 is transmitted in no case to the spindle by the clutch 20.

Next, a seat belt device according to a second embodiment of the invention will be described in detail by reference to FIGS. 9 to 12(c). Note that like reference numerals will be imparted to like portions to those of the first embodiment, and the description thereof will be omitted or briefly made.

In this embodiment, in place of the fixing pin 37 of the first embodiment, a hold spring 60 as an elastic member is provided so as to hold a rotor cam 34a. Namely, the rotor cam 34a has an end portion 61 which extends to an opposite side of a shaft 36 to a side where a cam surface 35 is provided. In addition, the hold spring 60 is built on a clutch wheel 28 so as to be brought into abutment with the end portion 61 on the opposite side of the rotor cam 34a.

By this configuration, the rotor cam 34a of this embodiment is mounted on the clutch wheel 28 so as to rotate round the shaft 36, and is fixed to the clutch wheel 28 so as not to rotate in such a state that the rotor cam 34a is biased by the hold spring 60. Furthermore, the rotor cam 34a is allowed to rotate when the biasing by the hold spring 60 is cancelled.

Next, the operation of a clutch 20a of this embodiment will be described.

Figure 9:
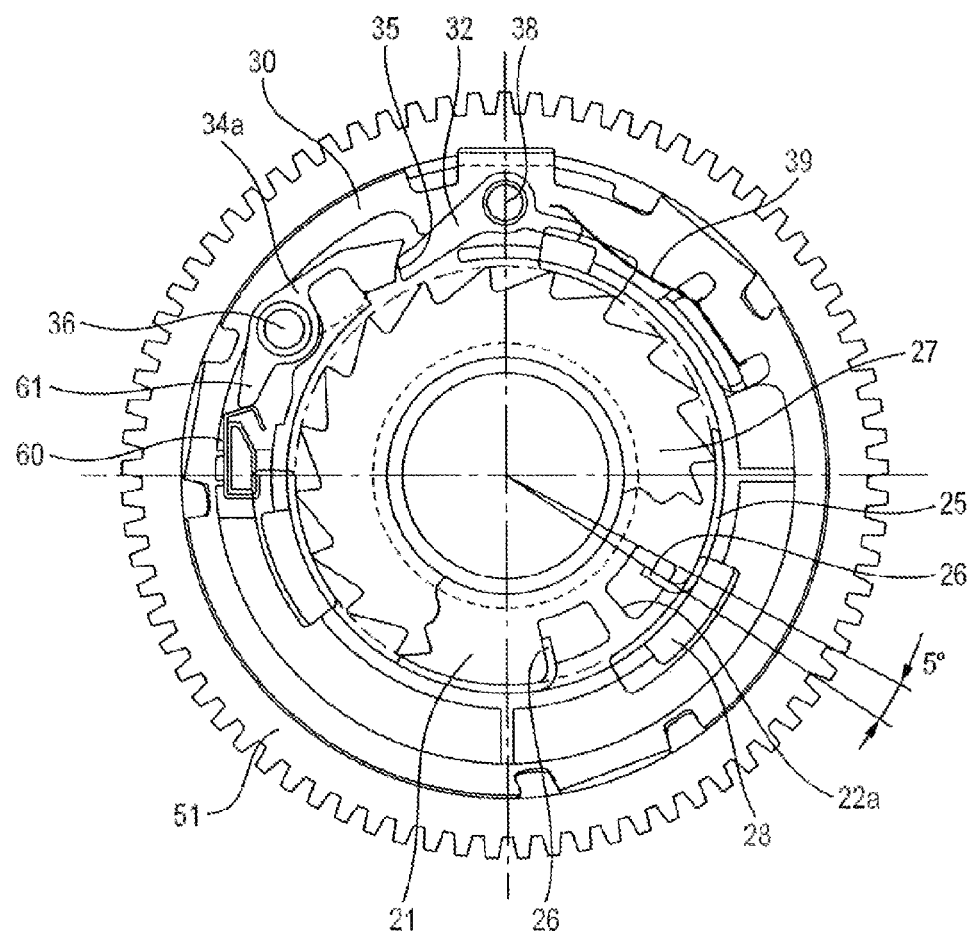
FIG. 9 is a view corresponding to the vertical sectional view taken along the line B-B in FIG. 1 which explains a clutch in an inoperative state of a seat belt device of a second embodiment of the invention.

Firstly, when no retraction by a motor 55 is performed, as shown in FIG. 9, a pawl 32 is disengaged from a latch plate 27 by virtue of the biasing force of a return spring 39. Due to this, only the latch plate 27 integrated with a spindle 11 rotates, whereby the normal retracting/stretching of the seat belt 13 is enabled.

Figure 10A:
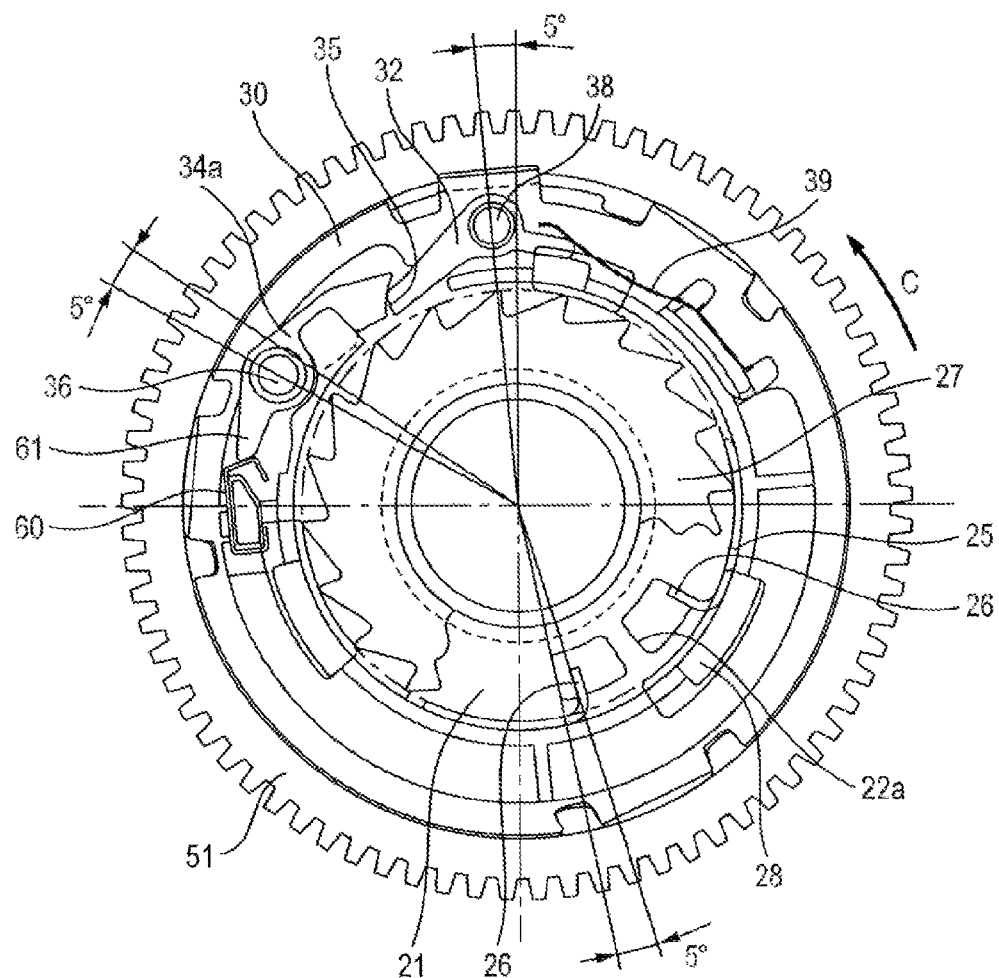
FIG. 10a is a view corresponding to the vertical sectional view taken along the line B-B in FIG. 1 which explains the clutch of the seat belt device of the second embodiment of the invention while a retraction by a motor is in operation.

Next, when the motor 55 rotates in a retracting direction, as shown in FIG. 10(a), a final gear 51 gear connected to a rotational shaft of the motor 55 rotates in a counterclockwise direction (C direction). When the final gear 51 rotates, a friction spring 25 idly rotates until a circumferential edge portion of a hole 22a in a lower cover 21.

Figure 10B:
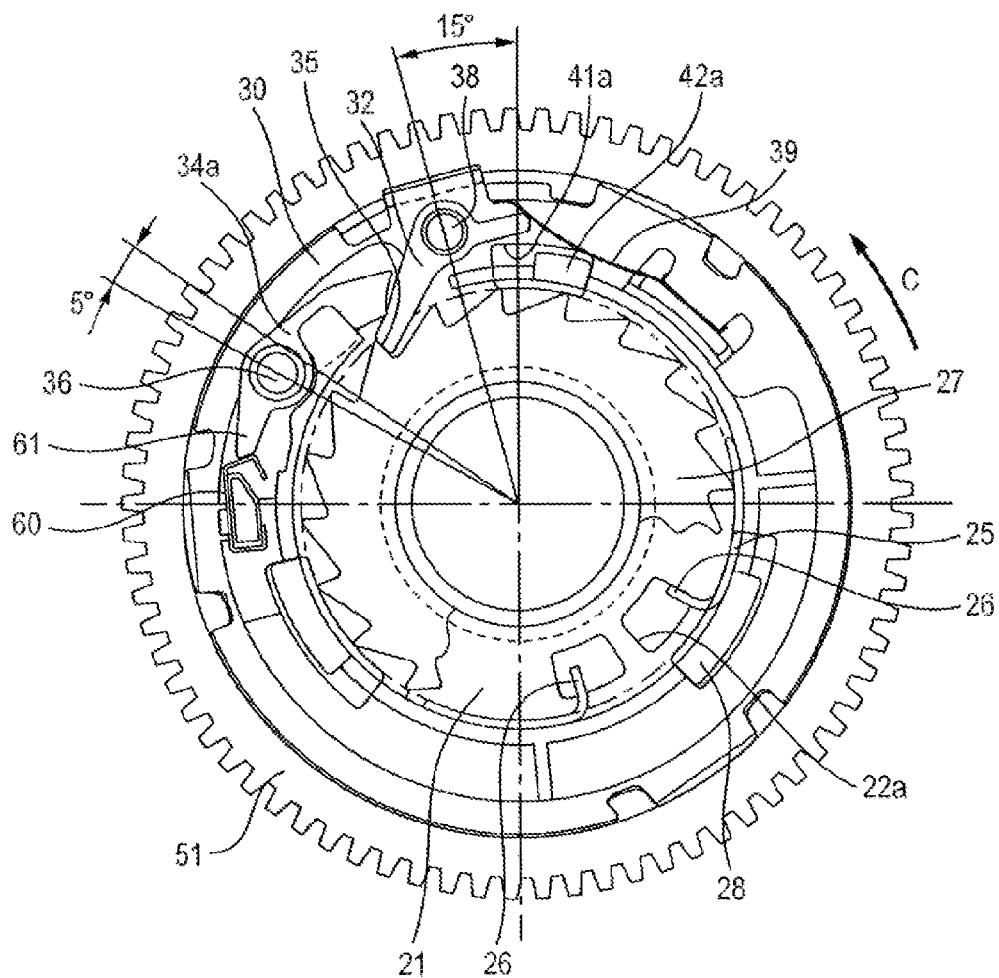
FIG. 10b is a view corresponding to the vertical sectional view taken along the line B-B in FIG. 1 which explains the clutch of the seat belt device of the second embodiment of the invention while the retraction by the motor is in operation.

When the motor 55 rotates in the retracting direction further, as shown in FIG. 10(b), the clutch wheel 28 is fixed by virtue of the frictional force of the friction spring 25, whereby only the final gear 51 rotates. In addition, the pawl 32 rotatably supported on a guide ring 30 rotates to the latch plate 27 side along the cam surface 35 of the rotor cam 34a against the biasing force of the return spring 39, so as to start engagement with the latch plate 27. Furthermore, when the final gear 51 rotates, leg portions 42a of the clutch wheel 28 are brought into abutment with circumferential edge portions of holes 41a of the guide ring 30, whereby the final gear 51 and the clutch wheel 28 rotate together.

Figure 10C:
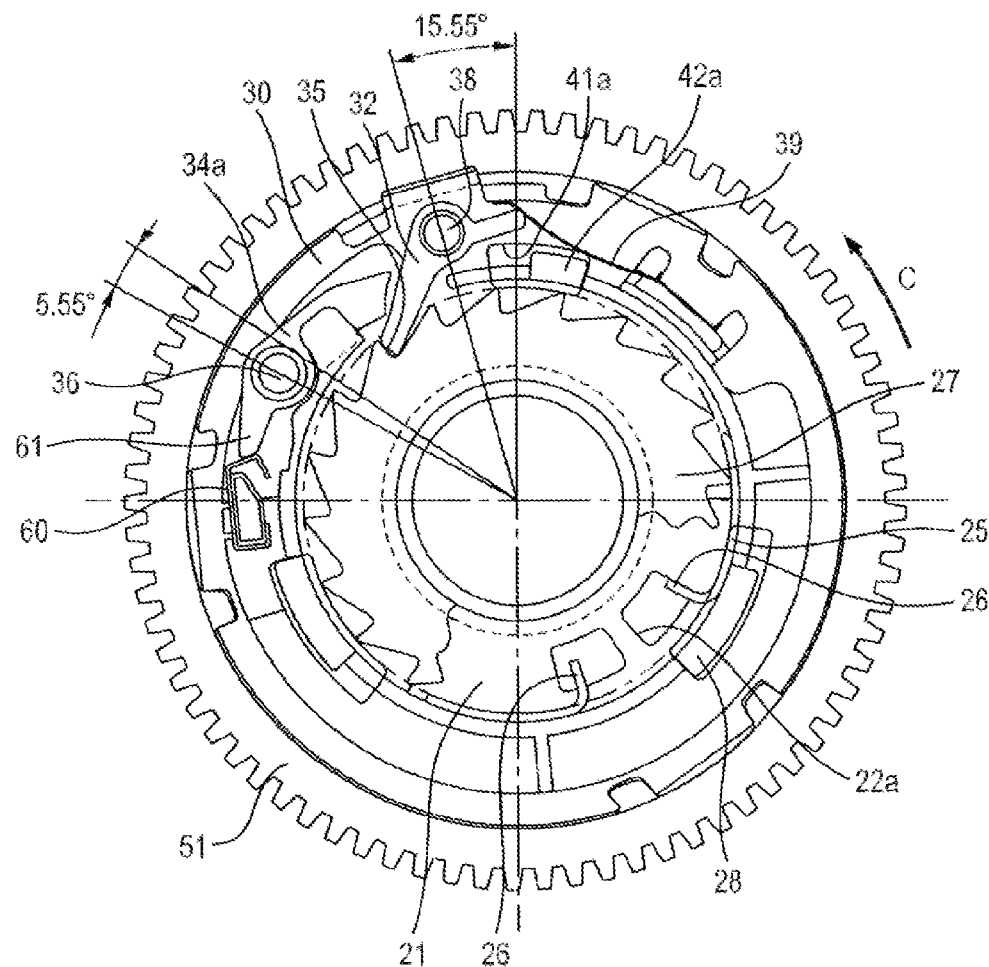
FIG. 10c is a view corresponding to the vertical sectional view taken along the line B-B in FIG. 1 which explains the clutch of the seat belt device of the second embodiment of the invention while the retraction by the motor is in operation.

In addition, as shown in FIG. 10(c), when the pawl 32 is brought into engagement with the latch plate 27, the rotation of the final gear 51 is transmitted to the spindle 11 via the latch plate 27, whereby the retracting of the seat belt 13 is started.

Figure 11A:
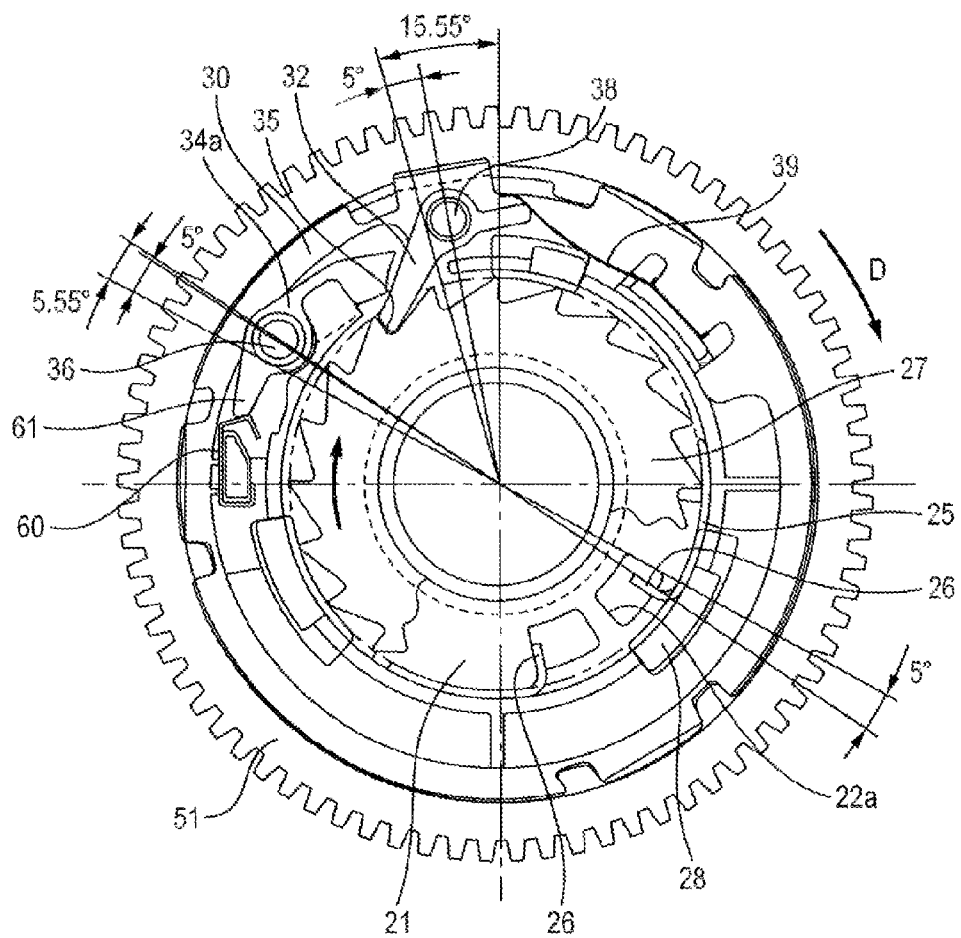
FIG. 11a is a view corresponding to the vertical sectional view taken along the line B-B in FIG. 1 which explains the clutch of the seat belt device of the second embodiment of the invention when the retraction by the motor is cancelled.
Figure 11B:
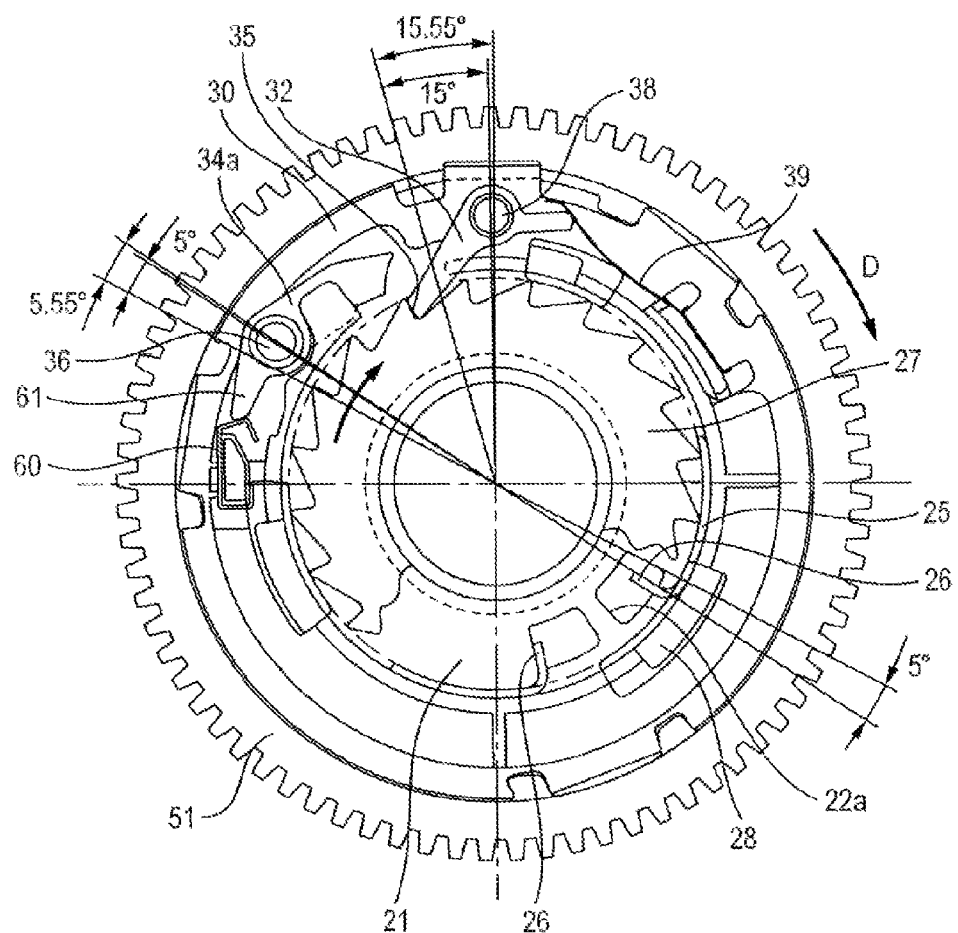
FIG. 11b is a view corresponding to the vertical sectional view taken along the line B-B in FIG. 1 which explains the clutch of the seat belt device of the second embodiment of the invention when the retraction by the motor is cancelled.

In addition, as shown in FIG. 11(a), when the motor 55 rotates in releasing direction, in response to the rotation, the final gear 51 rotates in the releasing direction (clockwise direction: D direction). Along with this, the webbing is stretched out by virtue of a reaction force from an occupant which is acting on the webbing, and the clutch wheel 28 and the latch plate 27 rotate together by such an extent that the friction spring rotates idly. Thereafter, as shown in FIG. 11(b), the clutch wheel 28 is fixed by virtue of the biasing force of the friction spring 25, whereby only the final gear 51 and the latch plate 27 rotate in the releasing direction. The latch plate 27 maintains a meshing state with the pawl 32 while it is rotating in association with the rotation of the final gear 51.

Figure 11C:
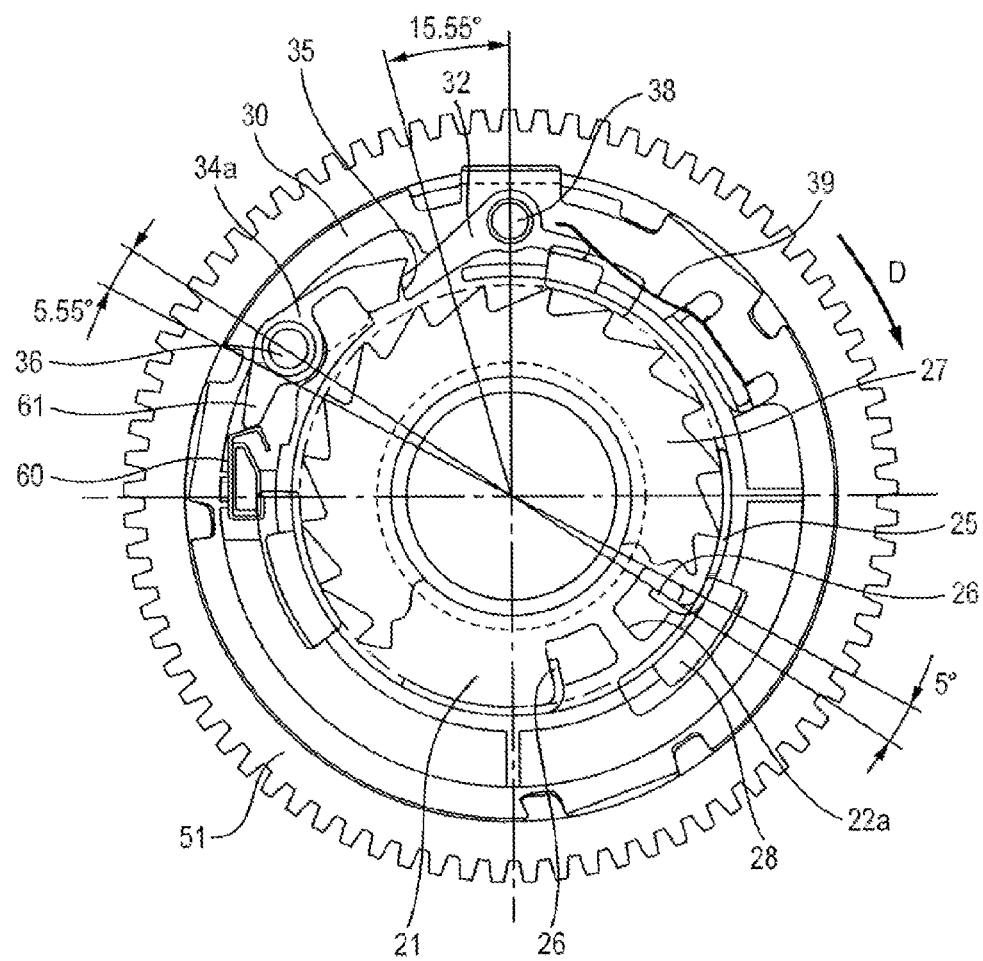
FIG. 11c is a view corresponding to the vertical sectional view taken along the line B-B in FIG. 1 which explains the clutch of the seat belt device of the second embodiment of the invention when the retraction by the motor is cancelled.

Then, as shown in FIG. 11(c), when there is no reaction force coming from the occupant and the rotation of the latch plate 27 together with the spindle 11 in the stretching direction ends, the final gear 51 rotates further. Accordingly, the engagement between the pawl 32 and the latch plate 27 is interrupted and an initial state is thereby restored.

Figure 12A:
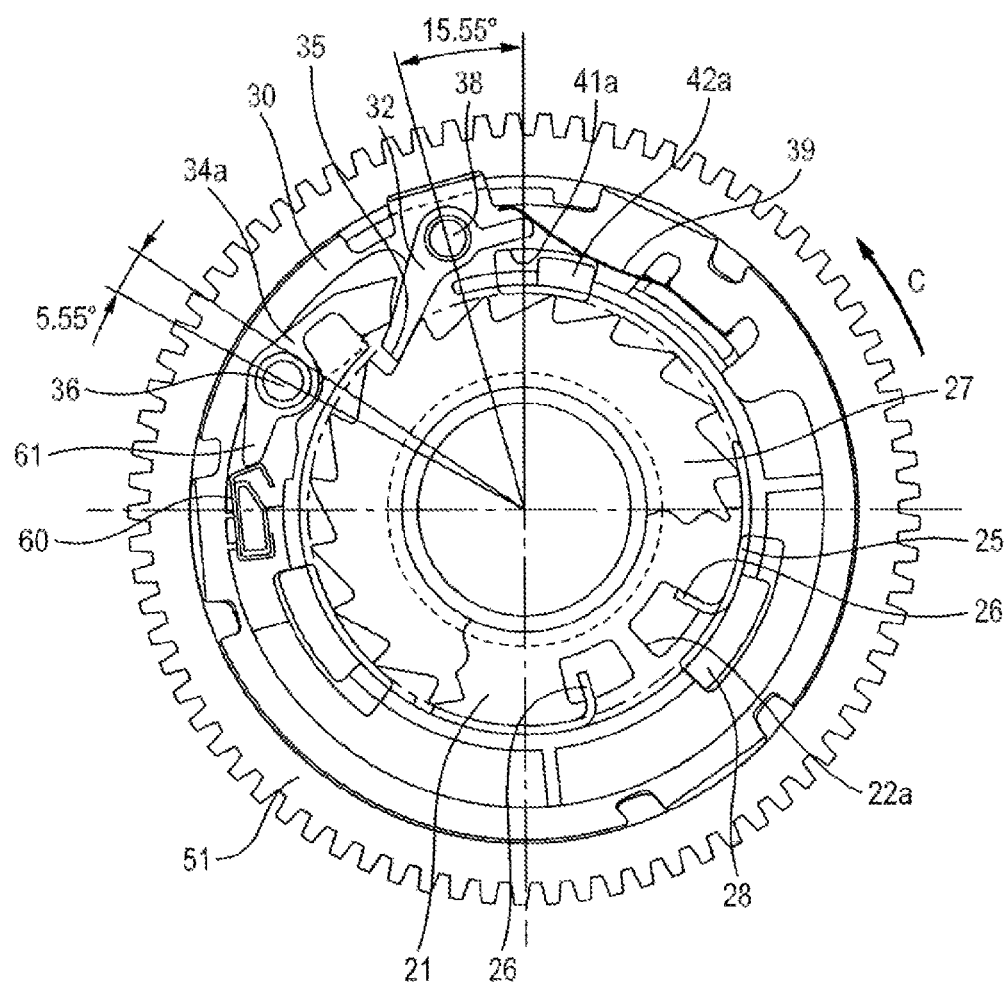
FIG. 12a is a view corresponding to the vertical sectional view taken along the line B-B in FIG. 1 which explains the clutch of the seat belt device of the second embodiment of the invention while a pre-tensioner is in operation.

In addition, as shown in FIG. 12(a), when the pre-tensioner 14 is activated in such a state that the motor rotates in the retracting direction, the pawl 32 is flicked out outwardly by a tooth surface of the latch plate 27 by virtue of the fast retracting rotation of the spindle 11 and the latch plate 27 integrated therewith.

Figure 12B:
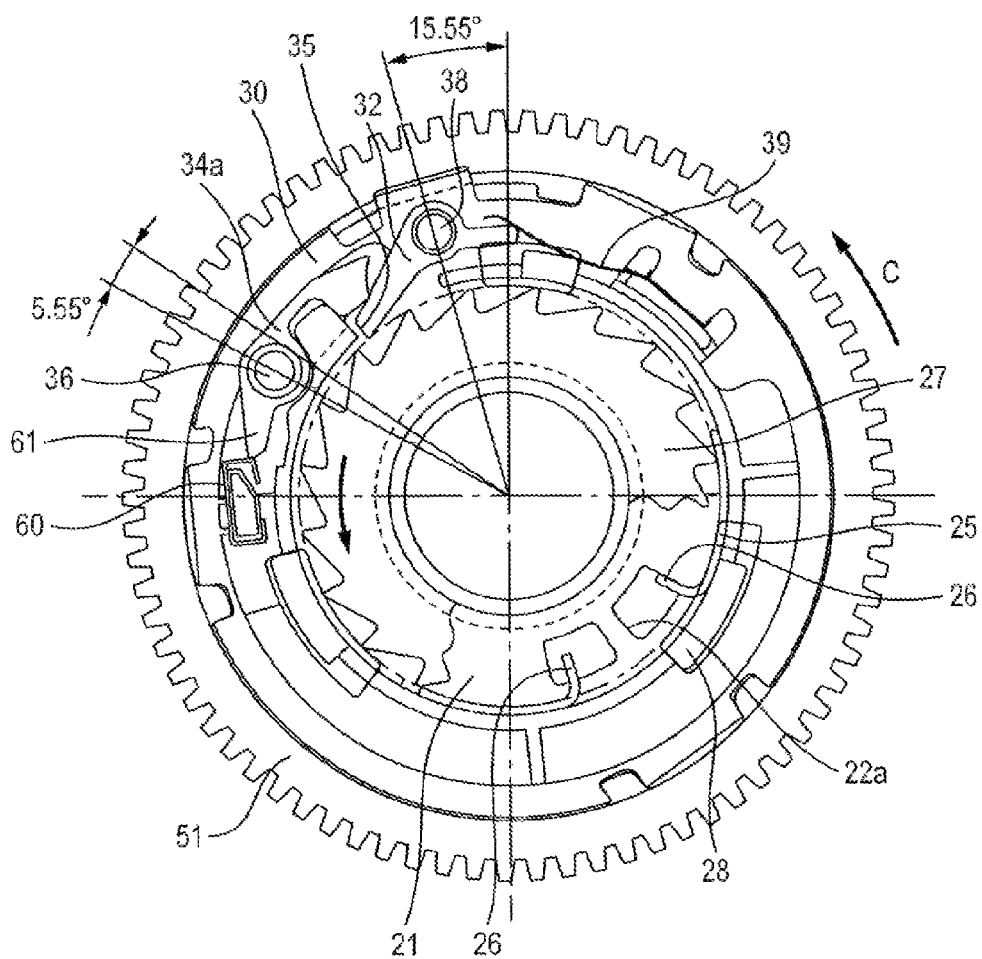
FIG. 12b is a view corresponding to the vertical sectional view taken along the line B-B in FIG. 1 which explains the clutch of the seat belt device of the second embodiment of the invention while the pre-tensioner is in operation.
Figure 12C:
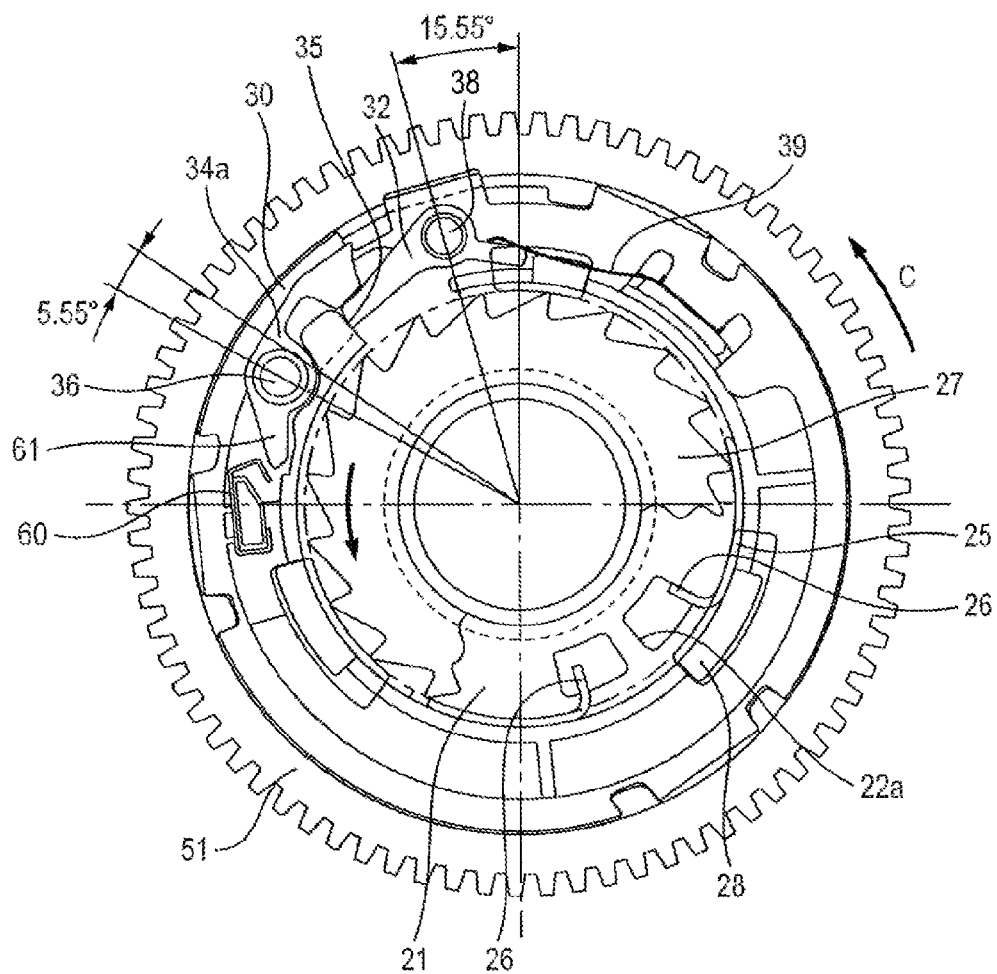
FIG. 12c is a view corresponding to the vertical sectional view taken along the line B-B in FIG. 1 which explains the clutch of the seat belt device of the second embodiment of the invention while the pre-tensioner is in operation.

Then, as shown in FIG. 12(b), when the pawl 32 is brought into abutment with the rotor cam 34 to thereby push the rotor cam 34 outwards, the rotor cam 34 rotates about the shaft 36, whereby the pressure from the hold spring 60 built on the clutch wheel 28 is released (refer to FIG. 12(c)). Thereafter, the pawl 32 and the rotor cam 34 are held on an outer circumferential portion of the guide ring 30 by virtue of the biasing force of the return spring 39. Therefore, the rotation of the motor 55 is transmitted in no case to the spindle 11 by the clutch 20.

Consequently, also in the seat belt device of this embodiment, the power transmission from the motor 55 is cut off by the clutch 20 at the time when the pre-tensioner 14 is activated, and the webbing is retracted by the pre-tensioner 14 without being subjected to power resistance by the motor 55 and the clutch 20. Therefore, it becomes possible to increase the retracting performance of the pre-tensioner 14.

Furthermore, while an energy absorbing operation is performed by the torsion bar 12, the power resistance of the motor 55 and the clutch 20 is added in no case to the belt stretching load, thereby making it possible to increase the restraining performance.

Figure 14:
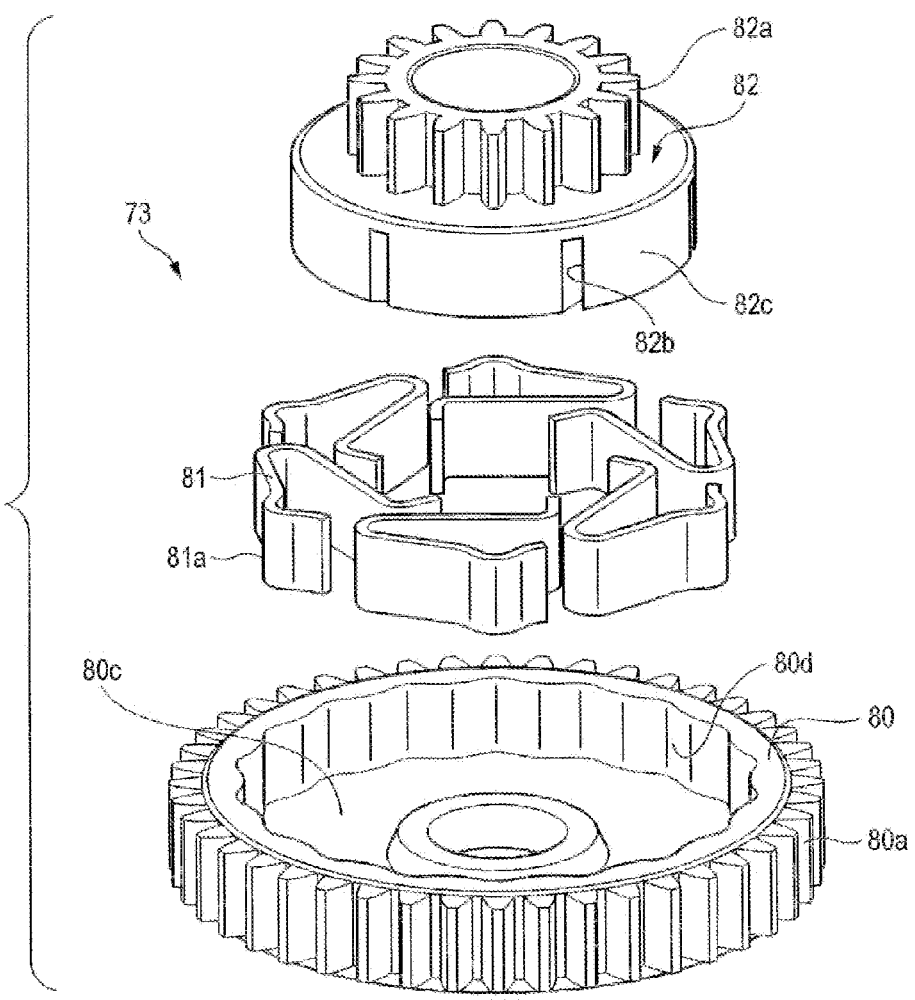
FIG. 14 is a view which explains a gear having a torque limiter in FIG. 13.
Figure 15:
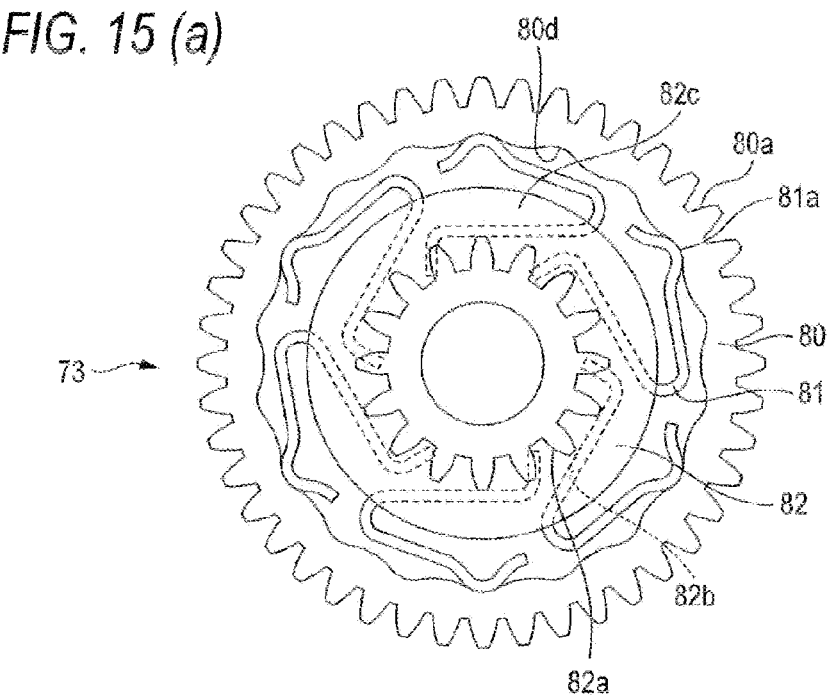
FIG. 15 are views which explain a torque limiting operation of the gear having the torque limiter.
Figure 15:
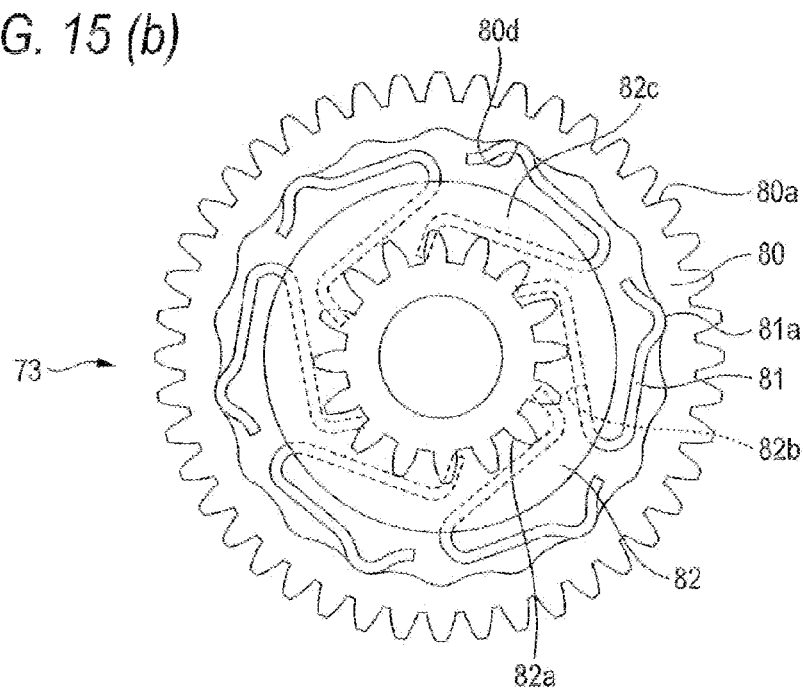

Next, a seat belt device according to a third embodiment of the invention will be described in detail by reference to FIGS. 13 to 15. This embodiment differs from the first embodiment in the configuration of a gear assembly, and like reference numerals will be imparted to the other like constituent portions to those of the first embodiment, whereby the description thereof will be omitted or made briefly.

Figure 13:
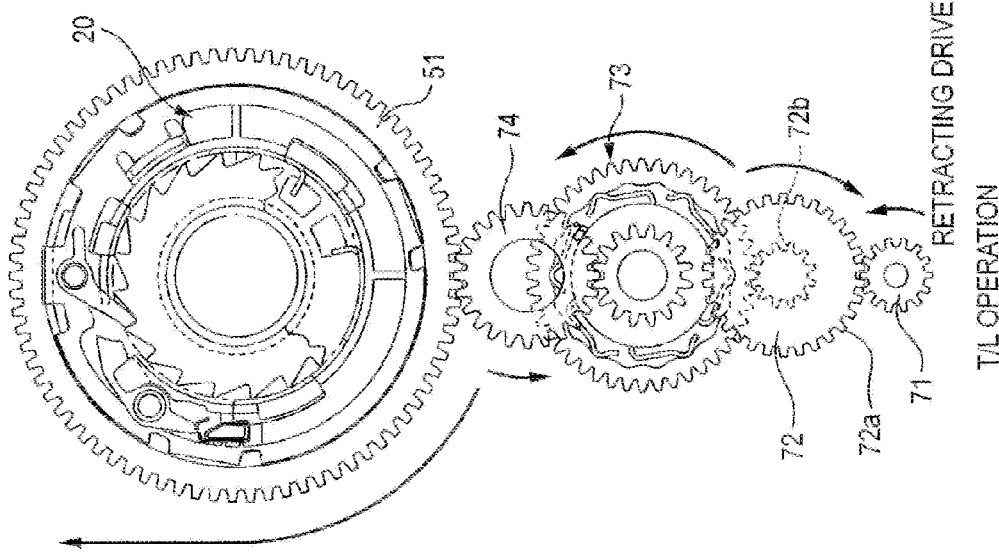
FIG. 13 are views which explain a gear assembly of a seat belt device of a third embodiment of the invention.
Figure 13:
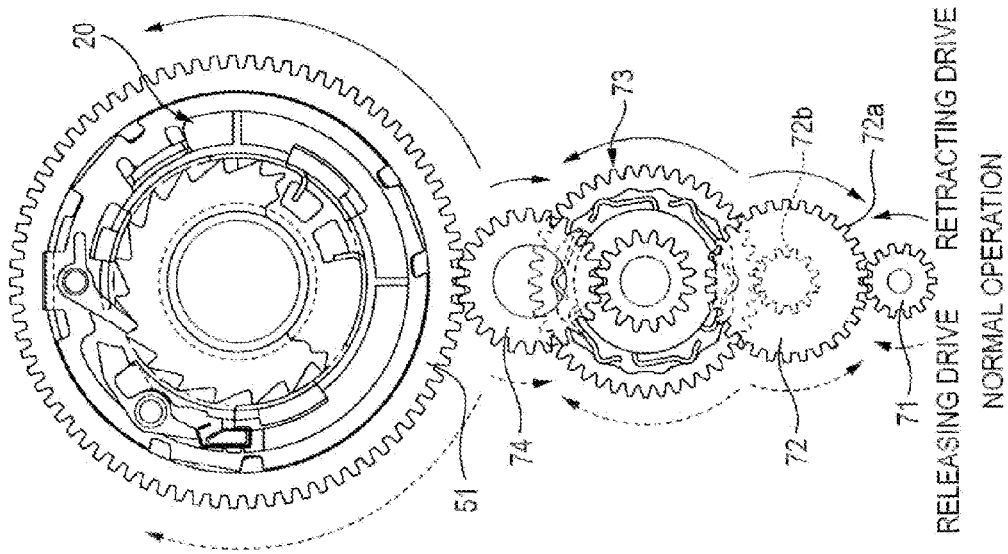

As shown in FIG. 13, a gear assembly 50a of this embodiment includes first to fourth gears 71, 72, 73, 74, and a tooth surface of the fourth gear 74 is in mesh engagement with a final gear 51. The first gear 71 is coupled to a motor shaft of a motor 55, and the second gear 72 has tooth surfaces 72a, 72b which are brought into mesh engagement with the first gear 71 and the third gear 73, respectively. As shown in FIG. 14, the third gear 73 is a gear assembly with a torque limiter mechanism including a large diameter side gear (an actuator-side gear) 80, a plurality of limit springs (elastic pieces) 81 and a tubular small diameter side gear (spindle-side gear) 82.

The small diameter side gear 82 has a shape in which a gear portion 82a meshing with the fourth gear 74, and a spring support portion 82c including slits 82b to which a plurality of limit springs 81 are assembled are coupled together in an axial direction.

The large diameter side gear 80 has a tooth portion 80a meshing with the second gear 72 on an outer circumferential surface thereof. Further, the large diameter side gear 80 accommodates the spring support portion 82c and the limit springs 81 of the small diameter side gear 82 in an interior wall 80b and a bottom portion 80c thereof to which grease is applied.

A plurality of concave locking surfaces 80d are formed at predetermined intervals on the interior wall 80b of the large diameter side gear 80. Projecting portions 81a formed on the limit springs 81 are brought into engagement with the locking surfaces 80d. In addition, the locking surfaces 80d are formed an integer number of times the number of the projecting portions 81a.

Next, the operation of the torque limiter mechanism will be described.

In the normal state, as shown in FIG. 13(a), the phases of the large diameter side gear 80 and the small diameter side gear 82 of the third gear 73 are held relative to each other. The large diameter side gear 80 and the small diameter side gear 82 rotate in the same direction in the retracting direction shown by a solid line or the releasing direction shown by a broken line. Here, when retracting is performed by driving the motor 55, in the event that a torque difference larger than a predetermined value is generated between the large diameter side gear 80 and the small diameter side gear 82 due to a light collision or braking which does not activate the pre-tensioner 14, as shown in FIG. 15, the projecting portions 81a of the limit springs 81 are released from the engagement with the locking surfaces 80d and then start to slide along the interior wall 80b while being deformed.

Then, due to the projecting portions 81a being brought into engagement with the adjacent locking surfaces 80d, a rotating deviation is generated between the large diameter side gear 80 and the small diameter side gear 82, and as shown in FIG. 13(b), the fourth gear 74 and the final gear 51 rotate in a belt stretching direction. As a result, the transmission of excessive torque by the motor 55 is suppressed, whereby the failure of gear teeth can be prevented and the effect on the restraining performance during energy absorption operation can be decreased.

In addition, the torque limiter mechanism is built in the third gear 73 of the gear assembly 50a, whereby although it is configured small, the torque limiter mechanism can increase the limiter torque of the spindle 11.

In addition, while the gear assembly 50a is preferably applied to the seat belt device which includes the power transmission mechanism of the first or second embodiment, the application thereof is not limited thereto. The gear assembly 50a may be applied to known seat belt devices.

Additionally, while the limit spring 81 of the embodiment is mounted on the small diameter side gear 82, the limit spring 81 may be mounted on the large diameter side 80, so as to be brought into engagement with or disengagement from the locking surfaces provided on the small side gear 82.

Note that the invention is not limited to the embodiments that have been described above but can be modified or improved as required.

In addition, this patent application is based on the Japanese Patent Application (No. 2005-146173) filed on May 19, 2005, and all the contents thereof are incorporated herein by reference.

While the above description constitutes the preferred embodiment of the present invention, it will be appreciated that the invention is susceptible to modification, variation and change without departing from the proper scope and fair meaning of the accompanying claims.

What is claimed is:
1. A seat belt device comprising:
a spindle for retracting a seat belt;
an electric actuator which generates a first force for rotating the spindle;
a pre-tensioner which can be activated to generate a second force for rotating the spindle; and
a power transmission mechanism which transmits the first force from the electric actuator to the spindle, wherein
the power transmission mechanism is capable of reversibly switching connection and disconnection between the electric actuator and the spindle before the pre-tensioner is activated, while when the pre-tensioner is activated, the power transmission mechanism interrupts the connection between the electric actuator and the spindle, the power transmission mechanism including:
a ratchet wheel which rotates together with the spindle;
a pawl which moves in response to the rotation of the electric actuator;
a cam member which restricts a movement of the pawl so that the pawl moves towards the ratchet wheel to bring the pawl into engagement with the ratchet wheel, when the pawl moves in response to the rotation of the electric actuator, and wherein when the pre-tensioner is activated, the pawl is caused to move in a direction in which the pawl moves away from the ratchet wheel by making use of the rotation of the ratchet wheel by the pre-tensioner, and the cam member is caused to move by the movement of the pawl to a position where the cam member is not capable of restricting the movement of the pawl.

2. The seat belt device as set forth in claim 1, wherein when the pre-tensioner is activated, the electric actuator and the spindle are disconnected from each other by making use of the rotation of the spindle by the pre-tensioner.

3. The seat belt device as set forth in claim 1, wherein the electric actuator is connected with the spindle by the power transmission mechanism, and wherein when the pre-tensioner is activated while the spindle is being rotated by the electric actuator, the electric actuator and the spindle are disconnected from each other.

4. A seat belt device comprising:
a spindle for retracting a seat belt;
an electric actuator which generates a first force for rotating the spindle;
a pre-tensioner which can be activated to generate a second force for rotating the spindle; and
a power transmission mechanism which transmits the first force from the electric actuator to the spindle, wherein
the power transmission mechanism is capable of reversibly switching connection and disconnection between the electric actuator and the spindle before the pre-tensioner is activated, while when the pre-tensioner is activated, the power transmission mechanism interrupts the connection between the electric actuator and the spindle, wherein the power transmission mechanism comprises:
a ratchet wheel which rotates together with the spindle;
a rotary member which connects to the electric actuator;
a pawl which is mounted rotatably on the rotary member and is capable of being brought into engagement with the ratchet wheel;
a friction wheel provided so as to be in contact with the rotary member; and
a cam member mounted on the friction wheel by a fixing member and along whose cam surface one end of the pawl is made to move, wherein when the pre-tensioner is activated, the pawl is caused to move in a direction in which the pawl moves away from the ratchet wheel by the rotation of the ratchet wheel by the pre-tensioner, so that the fixing member of the cam member is broken by the movement of the pawl, so as to prevent the engagement of the pawl with the ratchet wheel.

5. The seat belt device as set forth in claim 4, wherein the cam member is rotatably mounted on the friction wheel, and the rotation of the cam member is prohibited in such a state that the cam member is mounted on the friction wheel by the fixing member, while the cam member is allowed to rotate due to the fixing member being caused to fail.

6. The seat belt device as set forth in claim 4, further comprising a biasing member which biasing the pawl in a direction in which the pawl is released from the ratchet wheel, wherein after the fixing member of the cam member fails, the cam member is biased in a direction in which the cam member moves away from the ratchet wheel via the pawl by virtue of biasing force of the biasing member.

7. The seat belt device as set forth in claim 4, wherein the friction wheel has a rib adapted to be brought into abutment with the pawl so as to prevent the engagement of the pawl with the ratchet wheel when the electric actuator remains inoperative.

8. A seat belt device comprising:
a spindle for retracting a seat belt;
an electric actuator which generates a first force for rotating the spindle;
a pre-tensioner which can be activated to generate a second force for rotating the spindle; and
a power transmission mechanism which transmits the first force from the electric actuator to the spindle, wherein
the power transmission mechanism is capable of reversibly switching connection and disconnection between the electric actuator and the spindle before the pre-tensioner is activated, while when the pre-tensioner is activated, the power transmission mechanism interrupts the connection between the electric actuator and the spindle, wherein the power transmission mechanism comprises:
a ratchet wheel which rotates together with the spindle;
a rotary member which connects to the electric actuator;
a pawl which is mounted rotatably on the rotary member and which is capable of being brought into engagement with the ratchet wheel;
a friction wheel provided so as to be in contact with the rotary member; and
a cam member mounted on the friction wheel in such a state that the cam member is biased by means of an elastic member and along whose cam surface one end of the pawl is made to move, wherein when the pre-tensioner is activated, the pawl is caused to move in a direction in which the pawl moves away from the ratchet wheel by the rotation of the ratchet wheel by the pre-tensioner, so that the biasing of the cam member by the elastic member is released by the movement of the pawl, so as to prevent the engagement of the pawl with the ratchet wheel.

9. The seat belt device as set forth in claim 8, wherein the cam member is rotatably mounted on the friction wheel, and the rotation of the cam member is prohibited in such a state that the cam member is mounted on the friction wheel by being biased by the elastic member, while the cam member is allowed to rotate due to the release of the biasing of the elastic member.

10. The seat belt device as set forth in claim 8, further comprising a biasing member which biases the pawl in a direction in which the pawl is released from the ratchet wheel, wherein after the biasing of the cam member by the elastic member is released, the cam member is biased in a direction in which the cam member moves away from the ratchet wheel via the pawl by virtue of biasing force of the biasing member.

11. A seat belt device comprising:
a spindle for retracting a seat belt;
an electric actuator which generates a first force for rotating the spindle;
a pre-tensioner which generates a second force for rotating the spindle; and
a power transmission mechanism which transmits from the first force to the spindle, wherein when the pre-tensioner is activated, the power transmission mechanism interrupts the connection between the electric actuator and the pre-tensioner by making use of the rotation of the spindle by the pre-tensioner, the power transmission mechanism including:
a ratchet wheel which rotates together with the spindle;
a pawl which moves in response to the rotation of the electric actuator;

a cam member which restricts a movement of the pawl so that the pawl moves towards the ratchet wheel to bring the pawl into engagement with the ratchet wheel, when the pawl moves in response to the rotation of the electric actuator, and wherein when the pre-tensioner is activated, the pawl is caused to move in a direction in which the pawl moves away from the ratchet wheel by making use of the rotation of the ratchet wheel by the pre-tensioner, and the cam member is caused to move by the movement of the pawl to a position where the cam member is not capable of restricting the movement of the pawl.

\* \* \* \* \*